Nov. 22, 1927.

G. WOLF

ILLUMINATING DEVICE FOR MEDICAL PURPOSES

Filed Dec. 17, 1924

Inventor:
Georg Wolf

Patented Nov. 22, 1927.

1,650,563

UNITED STATES PATENT OFFICE.

GEORG WOLF, OF BERLIN, GERMANY, ASSIGNOR TO THE FIRM OF GEORG WOLF G. M. B. H., OF BERLIN, GERMANY.

ILLUMINATING DEVICE FOR MEDICAL PURPOSES.

Application filed December 17, 1924, Serial No. 756,616, and in Germany December 21, 1923.

The present invention relates to an illuminating device for medical purposes. The new device contains two lens systems and a diaphragm, disposed between the two lens systems displaceable in the direction of the optical axis of these systems. The aperture of this diaphragm is imaged by the lens system lying behind it at the place to be illuminated, whereby a sharply defined field of illumination is attained. Owing to the possibility of displacing the diaphragm one attains the advantage that with a lens system fixed behind the diaphragm it is possible to cause the field of illumination, i. e. the image of the diaphragm, to move a little in the depth direction, and therefore to adjust it to the distance of the object to be illuminated from the last lens surface. In the new device the diaphragm may either be constructed as an open, e. g. an annular one, or it may be closed by means of a glass plate, i. e. either a frosted glass plate, a colored glass or a plate provided with cross-hairs.

Figure 1:
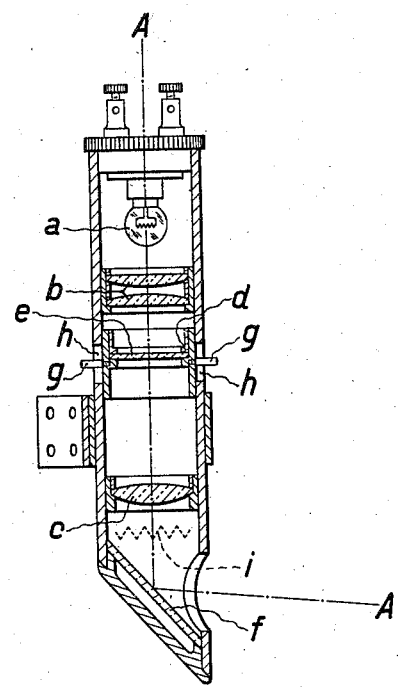
Figure 2:
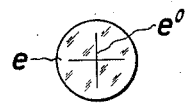

The annexed drawing shows an example of a forehead lamp according to the present invention. Fig. 1 shows a section containing the optical axis, Fig. 2 shows a detail.

The source of light is formed by the filament of an electric lamp $a$. Behind the glow lamp is disposed a condenser system $b$ and a projecting system $c$. Between both there is a diaphragm $d$ which can be closed by a detachable, coloured frosted glass plate $e$ provided with cross-hairs $e^o$. Behind the projecting system $c$ lies a reflector $f$, deflecting the ray pencil out of its original direction by about 90°. The diaphragm $d$ is displaceable in the direction of the axis A—A. For this purpose the mount of the diaphragm is provided with two pins $g$ which are guided in two slits $h$ of the tube enclosing the whole device. Optically the arrangement has been made in such a way that the condenser $b$ and the projecting system $c$ together would produce an enlarged image $i$ of the filament of the lamp $a$ if the frosted glass plate $e$ were not present, and that by the system $c$ an image of the aperture of the diaphragm $d$ and the cross-hairs $e^o$ is produced at the desired distance. The image of the cross-hairs serves for dividing the field of illumination into parts on which reference may be made with the instruction of students.

This forehead lamp is used in the following manner. After the physician and the patient have assumed the requisite position, relatively to each other, whereby suitably both the head of the physician and the part of the body to be observed of the patient, e. g. also his head are supported by suitable rests, the physician adjusts the diaphragm $d$ in such a way that a sharp, and therefore a brightest possible image of the diaphragm is produced on the part of the body to be observed. If, for instance, this part was lying at the front of the mouth and if, without displacing the head rests, a place of the pharynx of the patient is to be observed, the diaphragm must again be a little displaced until a sharp, and therefore a brightest possible image is produced on the second place to be observed.

I claim:

Illuminating device for medical purposes containing a source of light, two lens systems, of which the one more remote from the source of light is adapted to receive the luminous rays emerging from the one next to the source of light, and a diaphragm, disposed between the two lens systems and displaceable in the direction of the optical axis of the lens systems, the lens system more remote from the source of light producing at some distance a real image of the aperture of the said diaphragm.

GEORG WOLF.